US010012314B2

(12) United States Patent
Becker et al.

(10) Patent No.: US 10,012,314 B2
(45) Date of Patent: Jul. 3, 2018

(54) SNAP TOGETHER U-SHAPED CUP SEAL

(71) Applicants: Roger B. Becker, Nashua, NH (US);
Bengt Eriksson, Nashua, NH (US);
Ann-Christine Eriksson-Patey, Nashua, NH (US)

(72) Inventors: Roger B. Becker, Nashua, NH (US);
Bengt Eriksson, Nashua, NH (US);
Ann-Christine Eriksson-Patey, Nashua, NH (US)

(73) Assignee: GL&V Sweden AB, Stockholm (SE)

( * ) Notice: Subject to any disclaimer, the term of this patent is extended or adjusted under 35 U.S.C. 154(b) by 96 days.

(21) Appl. No.: 14/712,456

(22) Filed: May 14, 2015

(65) Prior Publication Data

US 2016/0334019 A1 Nov. 17, 2016

(51) Int. Cl.
| F16J 15/32 | (2016.01) |
| F16J 15/56 | (2006.01) |
| F16J 9/14 | (2006.01) |
| F16J 15/3272 | (2016.01) |
| F16J 15/3236 | (2016.01) |
| F16J 15/18 | (2006.01) |

(52) U.S. Cl.
CPC ....... F16J 15/3272 (2013.01); F16J 15/3236 (2013.01); F16J 15/56 (2013.01); F16J 9/14 (2013.01); *F16J 15/188* (2013.01)

(58) Field of Classification Search
CPC .... F16J 15/188; F16J 15/3236; F16J 15/3272; F16J 15/56; F16J 9/14; F16J 9/28
USPC ........ 277/436, 437, 438, 439, 547, 631, 925
See application file for complete search history.

(56) References Cited

U.S. PATENT DOCUMENTS

| 2,723,143 | A | * | 11/1955 | Smith | .................... | F16L 19/065 |
| | | | | | | 156/293 |
| 3,124,502 | A | * | 3/1964 | Radke | ..................... | F16J 15/20 |
| | | | | | | 277/536 |
| 3,576,153 | A | | 4/1971 | Doutt | | |
| 3,605,201 | A | * | 9/1971 | Peterson | ................... | F16G 7/00 |
| | | | | | | 24/31 C |
| 3,642,291 | A | * | 2/1972 | Zeffer | ...................... | F16J 15/46 |
| | | | | | | 277/583 |
| 3,861,691 | A | * | 1/1975 | Wheeler | ............... | F16J 15/3236 |
| | | | | | | 277/553 |
| 4,255,903 | A | | 3/1981 | Reynolds et al. | | |
| 4,643,440 | A | * | 2/1987 | Massey, Jr. | ............ | F16J 15/186 |
| | | | | | | 277/530 |
| 4,650,584 | A | | 3/1987 | Macierewicz | | |
| 5,280,927 | A | * | 1/1994 | Greisinger | ........... | H02G 15/013 |
| | | | | | | 277/609 |
| 5,377,999 | A | * | 1/1995 | Gorman | ............... | F16J 15/3272 |
| | | | | | | 277/551 |
| 5,597,168 | A | | 1/1997 | Antonini | | |
| 5,695,201 | A | * | 12/1997 | Wheeler | ............... | F16J 15/3232 |
| | | | | | | 277/345 |
| 6,386,548 | B1 | * | 5/2002 | Grimanis | ............. | F16J 15/3488 |
| | | | | | | 277/400 |
| 6,557,857 | B1 | | 5/2003 | Goodman | | |

(Continued)

FOREIGN PATENT DOCUMENTS

GB 1535032 A 12/1978

*Primary Examiner* — Nicholas L Foster
(74) *Attorney, Agent, or Firm* — James Earl Lowe, Jr.

(57) ABSTRACT

A U-shaped cup seal comprises an inner wall, an outer wall spaced apart from the inner wall, a base connecting the inner wall and the outer wall, a first and having a tab, and a tab receiving second end.

14 Claims, 5 Drawing Sheets

(56) References Cited

U.S. PATENT DOCUMENTS

| | | | | |
|---|---|---|---|---|
| 6,726,220 B2* | 4/2004 | Grimanis | ............... | F16J 15/166 |
| | | | | 277/309 |
| 2012/0112421 A1* | 5/2012 | Sato | ...................... | F16J 15/067 |
| | | | | 277/631 |
| 2012/0326395 A1* | 12/2012 | McCarthy | .............. | F16J 15/188 |
| | | | | 277/551 |
| 2016/0153563 A1* | 6/2016 | Bissoon | ............... | F16J 15/3272 |
| | | | | 277/547 |

* cited by examiner

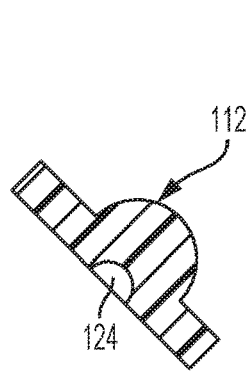
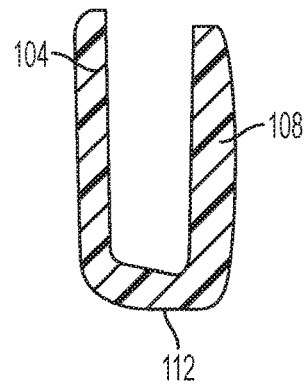
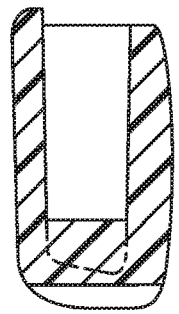
FIG. 7   FIG. 8   FIG. 9
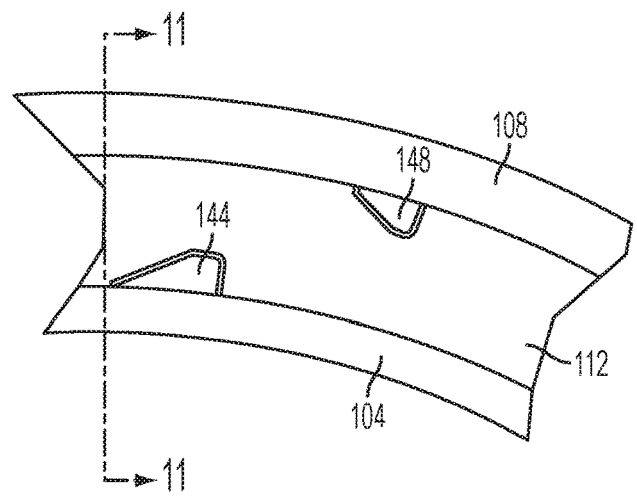
FIG. 10
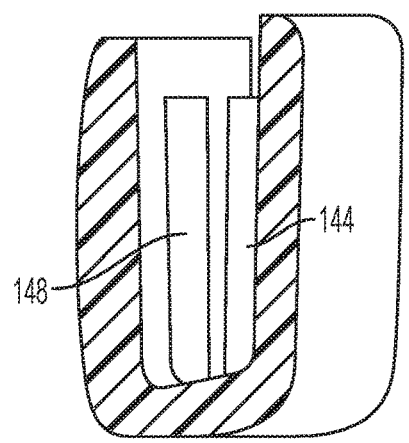
FIG. 11

SNAP TOGETHER U-SHAPED CUP SEAL

BACKGROUND

The present invention relates to U-shaped cup seals.

A prior art U-cup piston seal reproduced from Doutt U.S. Pat. No. 3,576,153 is illustrated in FIG. 2 of the drawings in its as-formed shape. The U-cup piston seal comprises an annular member 10 of resilient material having an arcuate inner surface 11 extending inwardly of the annular member and defining a portion of an annular flange 12 which is of smaller diameter than a secondary flange 13 formed in spaced relation thereto and immediately radially, outwardly thereof.

The area between the flanges 12 and 13 defines an annular groove 14 which extends well into the body of the annular U-cup piston seal.

The annular flange 13 is also angularly disposed sidewardly and radially of the piston seal and by still referring to FIG. 2 of the drawings, a vertical section of a piston 15 may be seen with a seal-receiving groove 16 annularly thereof. It will be observed that the smallest diameter of the piston seal 10 is smaller than the smallest diameter of the groove 16 in the piston 15. The piston 15 is mounted on a piston rod 18.

The piston seal 10 must be stretched and thereby distorted in placing it in the groove 16. When this occurs, the piston seal 10 assumes the configuration seen in FIG. 1 of the drawings. By referring to FIG. 1, it will be observed that the arcuate transverse plane of its smallest diameter has flattened out due to the distortion of installation as aforesaid. This results in the annular edge of the flange 12 which is rounded in a configuration resembling half of an O-ring sealingly engaging the adjacent surface of the piston.

When the piston with the seals mounted thereon, as seen in FIG. 1 of the drawings is installed in a cylinder, the flange 13 which is angularly disposed in its as-formed condition is distorted to a generally flat configuration so that it provides a sealing action with respect to the cylinder 17. Pressurized gas within the cylinder will also enter the annular groove 14 to further flatten flanges 12 and 13 against their respective surfaces. The area of the piston 15 between the annular grooves 16 provides for the positioning of a pair of annular bearing members 19.

As noted above, the piston seal 10 must be stretched and thereby distorted in placing it in the groove 16. There are instances however where it is not possible, or not desirable, to stretch and distort a seal. Conventionally, U-shaped cup seals have not been available in these instances. It would therefore be desirable if a cup seal were available where is not possible or desirable to stretch or distort a seal, such as when the seal is to be installed into a deep recess.

Further, when seal stretching and distortion occurs, seal material selection is limited. For example, in hot water seal applications, rubber is often used for seals because it has the necessary high elongation and flexibility properties, but rubber is difficult to use in friction fit applications, and the rubber seal exposed to hot water can fuse to a metal seat area.

SUMMARY

Disclosed is a U-shaped cup seal comprises an inner wall, an outer wall spaced apart from the inner wall, a base connecting the inner wall and the outer wall, a first end having a tab, and a tab receiving second end.

More particularly, disclosed is a U-shaped cup seal, the seal being annular and made of resilient material. The seal comprises an inner wall, an outer wall spaced apart from the inner wall, and a base connecting the inner wall and the outer wall. The seal has a first end having a tab extending from the base and between the inner and outer walls and beyond the first end, and a tab receiving second end. The tab has a top having a first outward extending protrusion, and a bottom having a second outward extending protrusion. The tab receiving second end has a first tab receiving protrusion on one of the inner and outer walls, extending toward the other wall, and a second tab receiving protrusion on the other wall, spaced apart from the first tab receiving protrusion, and extending toward the one wall.

BRIEF DESCRIPTION OF THE DRAWINGS

FIG. 7 is a cross-sectional view taken along the line 7-7 in FIG. 6.

FIG. 8 is a cross-sectional view taken along the line 8-8 in FIG. 6.

FIG. 9 is a cross-sectional view taken along the line 9-9 in FIG. 6.

FIG. 10 is a partial top view of a second end of the seal illustrated in FIG. 3.

FIG. 11 is a cross-sectional view taken along the line 11-11 in FIG. 10.

Figure 1:
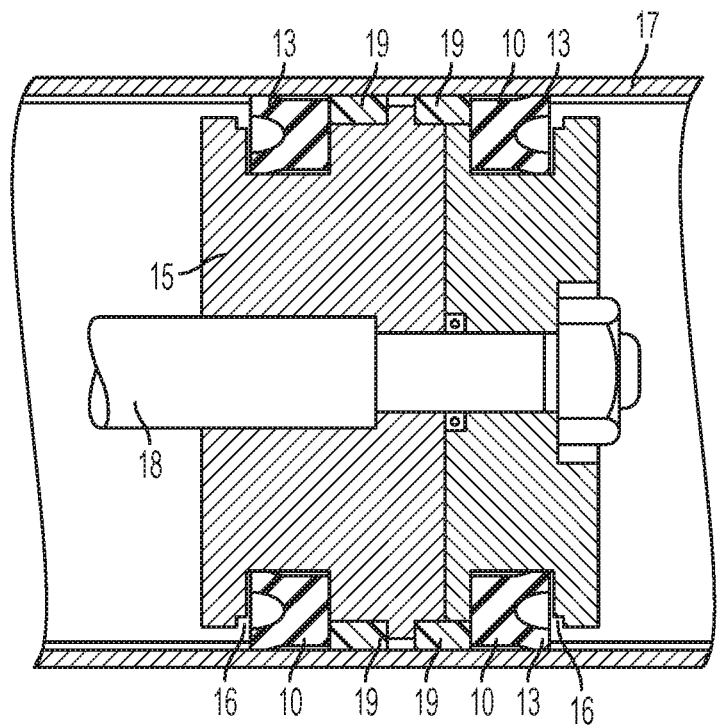
FIG. 1 is a cross-sectional elevation of a conventional piston and cylinder assembly with parts broken away and illustrating piston seals installed thereon.
Figure 2:
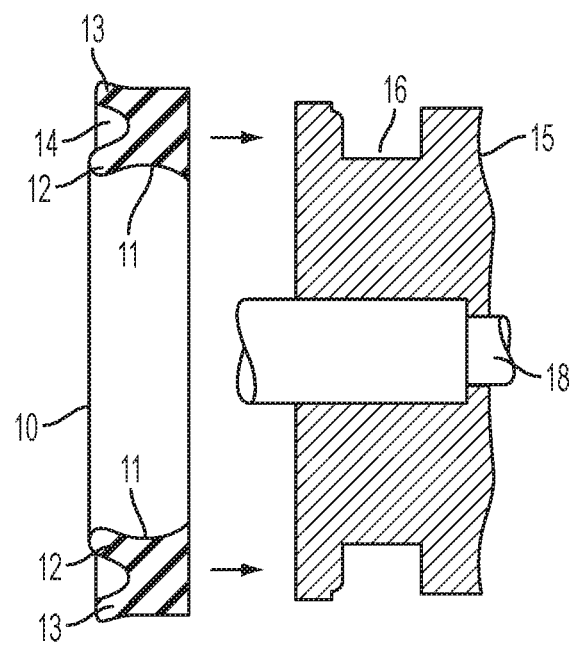
FIG. 2 is a composite view showing a vertical section through one of the piston seals in FIG. 1 in as-formed shape and a comparable sectional view of a piston and the area thereof in which the seal is installed.
Figure 3:
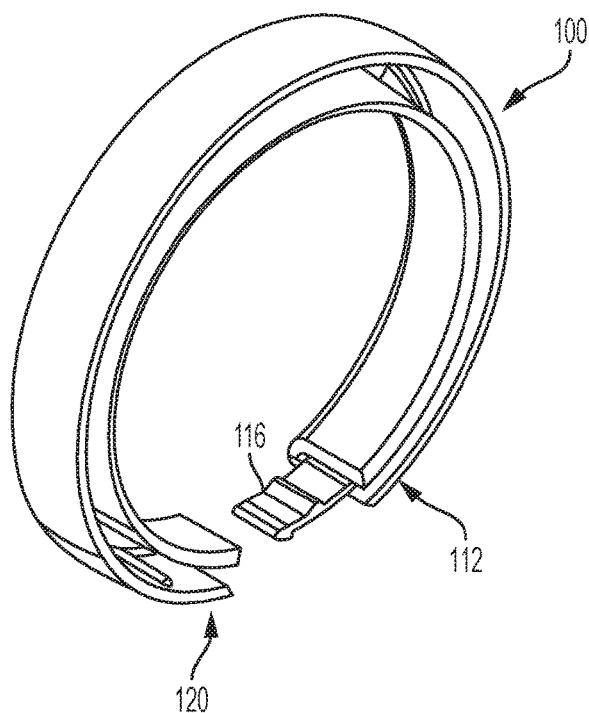
FIG. 3 is a top perspective view of a U-shaped cup seal according to this disclosure.

Before one embodiment of the disclosure is explained in detail, ft is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward". "side", "top" and "bottom", etc., are words of convenience and are not to be construed as limiting terms.

DESCRIPTION OF THE EMBODIMENT

Illustrated in FIGS. 3 through 14 is a snap together u-shaped cup seal 100 made from a resilient material, such as elastomer or flexible plastic material such as polyethylene. Polyethylene as compared to rubber is not as likely to fuse over time to metal seat areas. In other embodiments, other materials can be used. The seal 100 comprises an inner wall 104, an outer wall 108 spaced apart from the inner wall 104, a base 112 connecting the inner wall 104 and the outer wall 108, a first end 112 having a tab 116, and a tab receiving second end 120. The tab 116 is resilient, and the tab 116 extends from the base 112 between the inner 104 and outer 108 walls, as illustrated in FIG. 12, and FIGS. 13A, 13B and 13C. The tab 116 also extends beyond the first end 112, and the walls 104 and 108 and base 112 at the first end 112 are angled back away from the tab 116 to form a point.

Figure 4:
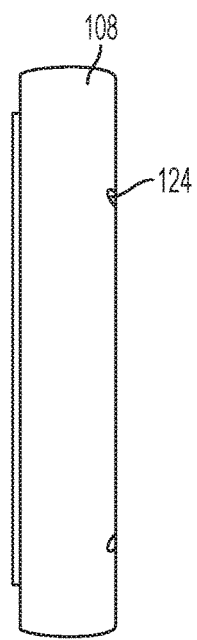
FIG. 4 is a side view of the seal illustrated in FIG. 3.
Figure 5:
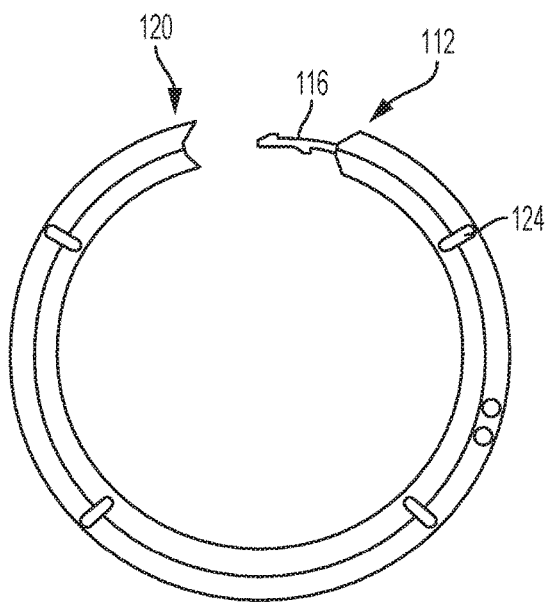
FIG. 5 is a bottom view of the seal illustrated in FIG. 3.
Figure 6:
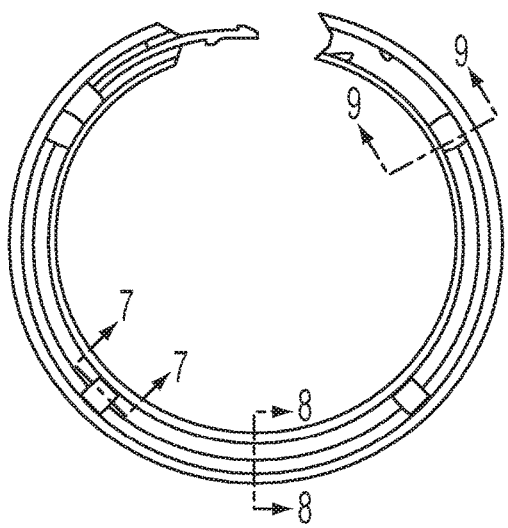
FIG. 6 is a top view of the seal illustrated in FIG. 3.
Figure 14B:
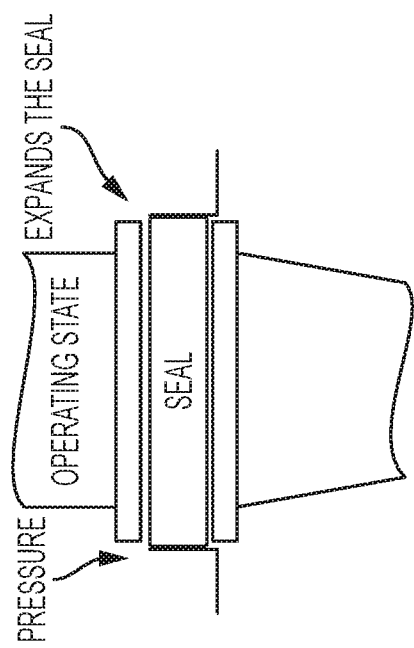
FIG. 14B is a side view of the seal illustrated in FIG. 3 in an operating state.
Figure 14A:
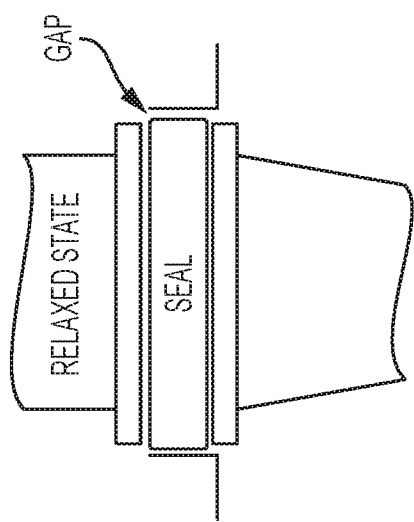
FIG. 14A is a side view of the seal illustrated in FIG. 3 in a relaxed state.

As illustrated in the drawings, the seal 100 is annular before and after the tab 116 is snapped into the tab receiving second end 120. Prior to the ends of the seal 100 being snapped together, the seal 100 can be flexed around an annular surface, such as shown in FIG. 14A, and then the ends 112 and 120 snapped together. Thereafter, when fluid pressure is applied above the seal 100, as shown in FIG. 14B, the seal was 104 and 108 expand, contacting and sealing the area above the seal 100 from the area below the seal 100. As illustrated in FIGS. 4, 5 and 7, spaced apart indentations 124 on the bottom of the seal 100 permit flow under the seal 100 while the seal 100 is expanding, but after expansion, the indentations 124 are flattened in a fluid tight fashion.

Figure 12:
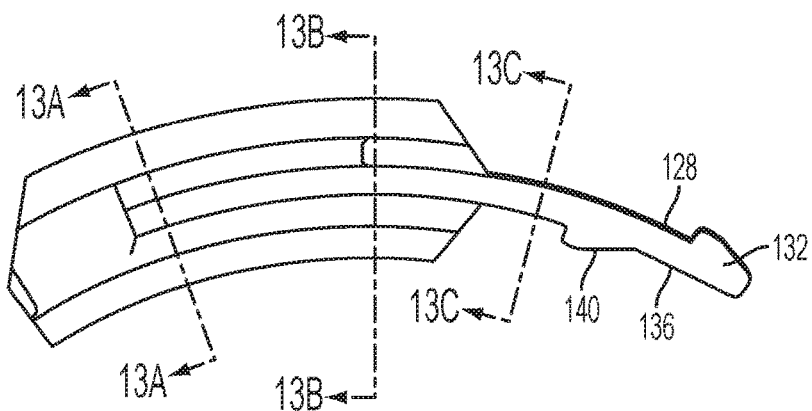
FIG. 12 is a partial top view of the first end of the seal illustrated in FIG. 3.
Figure 13A:
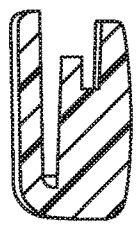
FIG. 13A is a cross-sectional view taken along the line 13A-13A in FIG. 12.
Figure 13B:
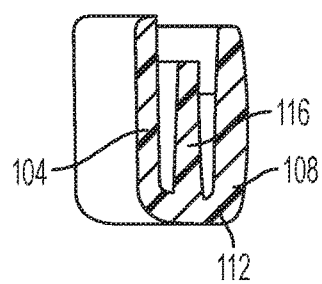
FIG. 13B is a cross-sectional view taken along the line 13B-13B in FIG. 12.
Figure 13C:
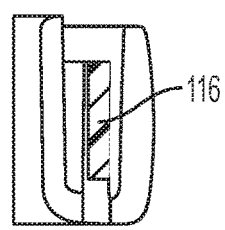
FIG. 13C is a cross-sectional view taken along the line 13C-13C in FIG. 12.

More particularly, the tab 116 is lockable into the tab receiving second end 120, so the tab 116 has a top 128 having a first outward extending protrusion 132, as illustrated in FIG. 12. The tab 116 also has a bottom 136 having a second outward extending protrusion 140 spaced apart from the first protrusion 132. As illustrated in FIG. 10, the tab receiving second end 120 has a first tab receiving protrusion 144 on the inner wall 104, extending toward the outer wall 108. And the tab receiving second end 120 also has a second tab receiving protrusion 148 on the outer wall 108, spaced apart from the first tab receiving protrusion 144, and extending toward the inner wall 104. The spacing between the first 144 and second 148 tab receiving protrusions is the same as the spacing between the first 132 and second 140 tab protrusions. As the flexible tab 116 enters the second tab receiving end 120 (not shown), the walls of the seal flex, permitting the tab protrusions 132 and 140 to pass by the tab receiving protrusions 144 and 148. But once past the protrusions, the tab 116 becomes locked in place with the tab protrusions engaging the second end tab receiving protrusions, and with the seal first end 112 engaging the seal second end 120. The walls and base at the tab receiving second end are angled back toward the center of the base, or notched, so that the point of the seal first end 112 is received in the notch of the seal second end 120. When in contact, the first and second ends of the seal 100 prevent fluid flow pass the seal ends 112 and 120.

The U-shaped cup seal 100 of this disclosure provides a split ring with a closure mechanism that can be used in any seal application, but especially those where a seal is to be installed into a deep recess. And since the seal expands after exposure to process fluid pressure, its initial installation into an opening when not expanded is simpler. Further, since it does not have to be stretched or distorted, a wider selection of seal materials is available.

Various other features of this disclosure are set forth in the following claims.

The invention claimed is:

1. A U-shaped cup seal adapted to be positioned around a surface, the seal comprising:
   a radially inner wall;
   a radially outer wall radially spaced apart from the inner wall;
   a base connecting the inner wall and the outer wall;
   a first end;
   a tab extending from and integral with the base, and extending between the inner and outer walls and beyond the first end, with a tab top facing towards and at least partially spaced apart from the outer wall, and a tab bottom facing towards and at least partially spaced apart from the inner wall, with at least one of the tab top and the tab bottom having a first radially outward extending protrusion; and
   a tab receiving second circumferential end, the tab receiving second end having a first tab receiving protrusion on at least one of the inner and outer walls and extending toward the other one of the inner and outer walls,
   wherein the tab is adapted to be placed inside the tab receiving second end such that the first outward extending protrusion can be locked in the tab receiving second end by the first tab receiving protrusion after the seal is positioned around the surface and the first end is placed in contact with the tab receiving second end.

2. The U-shaped cup seal according to claim 1, wherein the seal is made of resilient material.

3. The U-shaped cup seal according to claim 1, wherein at the first end the inner wall, the outer wall, and the base are angled back away from the tab.

4. The U-shaped cup seal according to claim 1, wherein at the tab receiving second end the inner wall, the outer wall, and the base are angled back toward a center of the base.

5. The U-shaped cup seal according to claim 1, wherein the other of the tab top and tab bottom has a second outward extending protrusion.

6. The U-shaped cup seal according to claim 1, wherein the tab receiving second end has a second tab receiving protrusion on the other one of the inner and outer walls, spaced apart from the first tab receiving protrusion, and extending toward the one of the inner and outer walls.

7. The U-shaped cup seal according to claim 1, wherein the seal is annular.

8. The U-shaped cup seal according to claim 1 wherein the outer wall has a convex surface in a wall top to bottom direction perpendicular to the seal end to end direction.

9. A U-shaped cup seal adapted to be positioned around an annular surface, the seal being annular and made of resilient material, and the seal comprising:
   a radially inner wall;
   a radially outer wall radially spaced apart from the inner wall;
   a base connecting the inner wall and the outer wall;
   a first end;
   a tab extending from and integral with the base, and extending between the inner and outer walls and beyond the first end, with a tab top facing towards and spaced apart from the outer wall and a tab bottom facing and at least partially spaced apart from the inner wall, with at least one of the tab top and the tab bottom having a first outward radially extending protrusion; and a tab receiving second circumferential end, the tab receiving second end having a first tab receiving protrusion on one of the inner and outer walls and extending toward the other one of the inner and outer walls, wherein the tab is adapted to be placed inside the tab receiving second end such that the first outward extending protrusion can be locked in the tab receiving second end by the first tab receiving protrusion after the seal is positioned around the annular surface and the first end is placed in contact with the tab receiving second end.

10. The U-shaped cup seal according to claim 9, wherein the other of the tab top and tab bottom has a second outward extending protrusion.

11. The U-shaped cup seal according to claim 9, wherein at the first end the inner wall, the outer wall, and the base are angled back away from the tab.

12. The U-shaped cup seal according to claim 9, wherein at the tab receiving second end the inner wall, the outer wall, and the base are angled back toward a center of the base.

13. The U-shaped cup seal according to claim 9, wherein the tab receiving second end has a second tab receiving protrusion on the other one of the inner and outer walls, spaced apart from the first tab receiving protrusion, and extending toward the one of the inner and outer walls.

14. The U-shaped cup seal according to claim 9 wherein the outer wall has a convex surface in a wall top to bottom direction perpendicular to the seal end to end direction.

* * * * *